United States Patent
Shen (10) Patent No.: US 10,558,012 B2
(45) Date of Patent: *Feb. 11, 2020

(54) MANUFACTURING METHOD FOR LIGHTWEIGHT LARGE-SIZE TELESCOPE MIRROR BLANKS AND MIRROR BLANKS FABRICATED ACCORDING TO SAME

(71) Applicant: Dar-Tson Shen, North Vancouver (CA)

(72) Inventor: Dar-Tson Shen, North Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/785,131

(22) Filed: Oct. 16, 2017

(65) Prior Publication Data
US 2018/0095240 A1  Apr. 5, 2018

Related U.S. Application Data (63) Continuation of application No. 14/866,714, filed on Sep. 25, 2015, now Pat. No. 9,810,876.
(Continued)

(51) Int. Cl.
*G02B 7/183* (2006.01)
*C03B 23/20* (2006.01)
(Continued)

(52) U.S. Cl.
CPC ............ *G02B 7/183* (2013.01); *C03B 23/006* (2013.01); *C03B 23/20* (2013.01); *G02B 5/08* (2013.01); *G02B 5/10* (2013.01)

(58) Field of Classification Search
CPC ....... Y10T 428/24174; Y10T 428/2457; Y10T 428/24562; Y10T 428/24479; G02B 5/08;
(Continued)

(56) References Cited

U.S. PATENT DOCUMENTS

| | | |
|---|---|---|
| 2,988,959 A | 6/1961 | Pelkey |
| 3,514,275 A | 5/1970 | Bray |

(Continued)

FOREIGN PATENT DOCUMENTS

| | | |
|---|---|---|
| CN | 102495438 B | 4/2014 |
| JP | 2006276429 | 10/2006 |

(Continued)

OTHER PUBLICATIONS

International Search Report for PCT/CA2015/050967 dated Jan. 25, 2016.

*Primary Examiner* — Alexander S Thomas
(74) *Attorney, Agent, or Firm* — Todd A. Rattray; Oyen Wiggs Green & Mutala LLP (57) ABSTRACT

A method for manufacturing a mirror blank comprises: providing a primary piece of glass comprising a primary planar surface and a backing piece of glass comprising a backing planar surface; assembling a mirror blank assembly, wherein assembling the mirror blank assembly comprises interposing a plurality of glass splines between the primary glass and the backing glass. Interposing the plurality of glass splines comprises: for each glass spline, respectively abutting first and second opposed surfaces of the glass spline against the primary planar surface of the primary glass and against the backing planar surface of the backing glass. The mirror blank assembly is then heated to fuse the interposed glass splines to the primary glass and the backing glass while the primary glass and the secondary glass remain spaced apart from one another by the interposed glass splines to thereby provide the mirror blank.

23 Claims, 7 Drawing Sheets

Related U.S. Application Data (60) Provisional application No. 62/055,592, filed on Sep. 25, 2014.

(51) Int. Cl.
*G02B 5/10* (2006.01)
*G02B 5/08* (2006.01)
*C03B 23/00* (2006.01)

(58) Field of Classification Search
CPC ....... G02B 7/183; C03B 23/20; C03B 23/203; F24J 2002/5218; F24J 2/5205
See application file for complete search history.

(56) References Cited

U.S. PATENT DOCUMENTS

| | | |
|---|---|---|
| 3,535,098 A | 10/1970 | Babcock |
| 4,447,130 A | 5/1984 | Christiansen et al. |
| 4,670,338 A | 6/1987 | Clemino |
| 4,898,604 A | 2/1990 | Sauerwein |
| 4,917,934 A | 4/1990 | Sempolinski |
| 5,118,552 A | 6/1992 | Sempolinski |
| 5,576,884 A | 11/1996 | Ise et al. |
| 6,045,231 A | 4/2000 | Martineau |
| 6,176,588 B1 | 1/2001 | Davis, Jr. et al. |
| 6,598,984 B2 | 7/2003 | Rietz et al. |
| 6,699,341 B2 | 3/2004 | Conzone et al. |
| 6,776,006 B2 | 8/2004 | Best et al. |
| 7,069,747 B2 | 7/2006 | DeSmitt et al. |
| 7,429,114 B2 | 9/2008 | Desmitt et al. |
| 7,766,494 B1 | 8/2010 | Desmitt et al. |
| 8,439,509 B2 | 5/2013 | Schwartz |
| 8,602,576 B1 | 12/2013 | Desmitt et al. |
| 8,604,333 B2 | 12/2013 | Angel et al. |
| 8,641,937 B2 | 2/2014 | Taguchi et al. |
| 2008/0043352 A1 | 2/2008 | Liu |
| 2012/0182636 A1* | 7/2012 | Seibert ................ G02B 7/183 359/869 |
| 2013/0047669 A1 | 2/2013 | Annamalai |
| 2013/0258569 A1 | 10/2013 | Amin et al. |

FOREIGN PATENT DOCUMENTS

| | | |
|---|---|---|
| WO | 8201422 A1 | 4/1982 |
| WO | 2014058847 A1 | 4/2014 |
| WO | 2014122111 A2 | 8/2014 |

* cited by examiner

MANUFACTURING METHOD FOR LIGHTWEIGHT LARGE-SIZE TELESCOPE MIRROR BLANKS AND MIRROR BLANKS FABRICATED ACCORDING TO SAME

RELATED APPLICATIONS

This application is a continuation of U.S. application Ser. No. 14/866,714 filed 25 Sep. 2015 now issued as U.S. Pat. No. 9,810,876, which in turn is a non-provisional application claiming priority, and the benefit under 35 U.S.C. § 119(e), from U.S. application No. 62/055,592 filed 25 Sep. 2014. All of the applications referred to in this paragraph are hereby incorporated herein by reference.

TECHNICAL FIELD

The invention relates to mirror blanks and their manufacture. Particular non-limiting embodiments provide lightweight large-size telescopic mirror blanks and methods of manufacturing the same.

BACKGROUND

Some optical instruments, such as telescopes and/or the like make use of large mirrors (e.g. 18" and greater in diameter). Such large mirrors can be used at the primary (light gathering) mirrors of such optical instruments. Mirrors for optical instruments are typically formed by coating a reflective material (such as silver) onto a surface of a mirror blank typically fabricated from glass.

Traditionally, to provide sufficient structural rigidity, large mirror blanks (e.g. 18" and greater in diameter) are made of a single solid piece of glass. The solid piece of glass is preheated until soft and then forged into the desired shape. After forging, the glass is cooled and drafted.

After cooling and drafting, there typically exists a large amount of residual stress within the glass that forms the blank. To reduce residual stress, the glass that forms the blank is typically annealed. Annealing involves controllably and slowly heating the glass to an annealing temperature, heat soaking the glass at the annealing temperature and then slowly and controllably decreasing the temperature of the glass. Annealing takes considerable time (e.g. hundreds of hours). It is not uncommon for the glass to crack during the heating and cooling processes associated with annealing.

To prevent optical distortion which may be caused, for example, by deformation of a solid glass mirror under its own weight, telescope frames have to be strong and rigid. This requirement raises the cost of manufacturing telescopes and leads to telescopes that are more difficult to assemble, disassemble and transport.

There is a general desire for improved mirror blanks and improved methods to manufacture mirror blanks.

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The invention comprises a number of non-limiting aspects. Non-limiting aspects of the invention comprise:

1. A method for manufacturing a mirror blank comprising:
    providing a primary piece of glass comprising a primary planar surface and a backing piece of glass comprising a backing planar surface;
    assembling a mirror blank assembly, wherein assembling the mirror blank assembly comprises interposing a plurality of glass splines between the primary glass and the backing glass, wherein interposing the plurality of glass splines comprises:
        for each glass spline, abutting a first surface of the glass spline against the primary planar surface of the primary glass and abutting a second surface of the glass spline, the second surface opposed to the first surface, against the backing planar surface of the backing glass; and
        arranging the plurality of glass splines to be circularly symmetric about an axis of symmetry that is orthogonal to the primary planar surface and the backing planar surface and to extend in directions that are radial from the axis of symmetry;
        wherein, for each glass spline, a dimension $l_1$ of the radial extension of the first surface which abuts the primary planar surface of the primary glass is greater than a dimension $l_2$ of the radial extension of the second surface which abuts the backing planar surface of the backing glass; and
    heating the mirror blank assembly to fuse the interposed glass splines to the primary glass and the backing glass while the primary glass and the secondary glass remain spaced apart from one another by the interposed glass splines to thereby provide the mirror blank.
2. A method according to aspect 1 or any other aspect herein wherein the primary glass, the backing glass and the glass splines have thermal coefficients that are the same +/−5%.
3. A method according to any one of aspects 1 to 2 or any other aspect herein wherein the primary glass, the backing glass and the glass splines have the same thermal coefficients.
4. A method according to any one of aspects 1 to 3 or any other aspect herein wherein the primary glass has a primary circular perimeter having a primary diameter $d_1$ and the backing glass has a backing circular perimeter having a backing diameter $d_2$ and $d_1 > d_2$.
5. A method according to aspect 4 or any other aspect herein comprising aligning the primary glass and the backing glass so that the axis of symmetry intersects the center of the primary circular perimeter and the backing circular perimeter.
6. A method according to any one of aspects 1 to 5 or any other aspect herein wherein each of the glass splines has a first height dimension x in a direction extending between the primary planar surface and the backing planar surface at a side of the glass spline closest to the axis of symmetry and a second height dimension y in the direction extending between the primary planar surface and the backing planar surface at a side of the glass spline most distal from the axis of symmetry and where y<x.
7. A method according to aspect 6 or any other aspect herein wherein the primary glass has a primary circular perimeter having a primary diameter $d_1$ and wherein, for each glass spline, the first height dimension x is in a range between ½ to ¹⁄₂₀ of the primary diameter $d_1$.

8. A method according to any one of aspects 6 to 7 or any other aspect herein wherein the primary glass has a primary circular perimeter having a primary diameter $d_1$ and wherein, for each glass spline, the first height dimension x is in a range between ⅙ to ⅒ of the primary diameter $d_1$.
9. A method according to any one of aspects 1 to 8 or any other aspect herein comprising shaping the primary glass to provide a primary opening therethrough.
10. A method according to aspect 9 or any other aspect herein comprising locating the primary glass such that the axis of symmetry extends through a center of the primary opening.
11. A method according to any one of aspects 9 to 10 or any other aspect herein comprising shaping the primary opening to have a circular perimeter.
12. A method according to any one of aspects 1 to 11 or any other aspect herein comprising shaping the backing glass to provide a backing opening therethrough.
13. A method according to aspect 12 or any other aspect herein comprising locating the backing glass such that the axis of symmetry extends through a center of the backing opening.
14. A method according to any one of aspects 12 to 13 or any other aspect herein comprising shaping the backing opening to have a circular perimeter.
15. A method according to any one of aspects 1 to 14 or any other aspect herein wherein interposing the plurality of glass splines between the primary glass and the backing glass comprises spacing the glass splines about the axis of symmetry with equal angular spacing between circumferentially adjacent pairs of glass splines.
16. A method according to any one of aspects 1 to 15 or any other aspect herein wherein interposing the plurality of glass splines between the primary glass and the backing glass comprises locating the plurality of glass splines such that portions of circumferentially adjacent glass splines closest to the axis of symmetry contact one another at locations spaced apart from the axis of symmetry.
17. A method according to any one of aspects 1 to 16 or any other aspect herein wherein interposing the plurality of glass splines between the primary glass and the backing glass comprises locating the plurality of glass splines such that portions of the glass splines closest to the axis of symmetry are spaced apart from the axis of symmetry and from one another.
18. A method according to aspect 17 or any other aspect herein wherein locating the plurality of glass splines such that the portions of the glass splines closest to the axis of symmetry are spaced apart from the axis of symmetry comprises locating the plurality of glass splines such that the portions of the glass splines closest to the axis of symmetry are spaced apart from the axis of symmetry by a radial dimension that is the same for each glass spline.
19. A method according to any one of aspects 17 to 18 or any other aspect herein wherein assembling the mirror blank assembly comprises interposing a glass connector between the primary glass and the backing glass, wherein interposing the glass connector between the primary glass and the backing glass comprising abutting a first surface of the glass connector against the primary planar surface of the primary glass and abutting a second surface of the glass connector against the backing planar surface of the backing glass and wherein heating the mirror blank assembly comprises heating the interposed glass connector and thereby fusing the glass connector to the primary glass and the backing glass.
20. A method according to aspect 19 or any other aspect herein comprising shaping the glass connector to define a bore therethrough and wherein interposing the glass connector between the primary glass and the backing glass comprises extending at least a portion of the bore between the primary planar surface of the primary glass and the backing planar surface of the backing glass.
21. A method according to aspect 20 or any other aspect herein comprising shaping the glass connector to define at least a portion of one or more venting apertures which permit fluid communication between the bore of the glass connector and a region outside of the bore of the glass connector when the glass connector is interposed between the primary glass and the backing glass.
22. A method according to aspect 21 or any other aspect herein wherein the one or more venting apertures are defined in part by at least one of the primary planar surface and the backing planar surface.
23. A method according to any one of aspects 19 to 22 or any other aspect herein wherein the glass connector comprises a cylindrical outer surface and wherein interposing the glass connector between the primary glass and the backing glass comprises aligning the cylindrical axis with the axis of symmetry and, for each glass spline, abutting a surface of the glass spline closest to the axis of symmetry against the cylindrical outer surface of the glass connector.
24. A method according to aspect 23 or any other aspect herein wherein heating the interposed glass connector comprises fusing the cylindrical outer surface of the glass connector to the glass splines.
25. A method according to any one of aspects 1 to 24 or any other aspect herein wherein assembling the mirror blank assembly comprises interposing a plurality of glass braces between the plurality of glass splines, wherein interposing the plurality of glass braces between the plurality of glass braces comprises, for each glass brace, abutting opposing surfaces of the glass brace against each of a corresponding pair of circumferentially adjacent glass splines.
26. A method according to aspect 25 or any other aspect herein wherein the glass braces are curved.
27. A method according to aspect 25 or any other aspect herein wherein the glass braces are generally straight and, for each glass brace, the opposing surfaces of the glass brace are bevelled with respect to the straight dimension of the glass brace.
28. A method according to any one of aspects 25 to 27 or any other aspect herein wherein heating the mirror blank assembly comprises heating the interposed glass braces and thereby, for each glass brace, fusing the opposing surfaces of the glass brace to the corresponding pair of circumferentially adjacent glass splines.
29. A method according to any one of aspects 25 to 28 or any other aspect herein wherein heating the mirror blank assembly comprises, for each glass brace, fusing the glass brace to the primary glass.
30. A method according to any one of aspects 25 to 29 or any other aspect herein wherein heating the mirror blank assembly comprises, for each glass brace, fusing the glass brace to the backing glass.
31. A method according to any one of aspects 1 to 30 or any other aspect herein wherein providing the primary piece of glass comprises abutting complementary surfaces of a pair of glass layers against one another, at least one of the complementary surfaces of the pair of glass layers comprising a plurality of channels, and wherein heating the mirror blank assembly comprises heating the pair of glass layers to fuse the complementary surfaces of the pair of glass layers to one another.

32. A method according to aspect 31 or any other aspect herein wherein at least one of the plurality of channels extends between peripheral edges of the at least one of the complementary surfaces of the pair of glass layers.

33. A method according to any one of aspects 1 to 32 or any other aspect herein comprising, after heating the mirror blank assembly to fuse the interposed glass splines to the primary glass and the backing glass, cooling the mirror blank using a plurality of cooling steps, the plurality of cooling steps comprising:
a first cooling step comprising allowing the mirror blank to cool in a first environment until the mirror blank reaches a set temperature; and
a second cooling step comprising allowing the mirror blank to cool in a second environment until the mirror blank reaches an ambient temperature;
wherein the first environment is regulated to have a decreasing temperature and the second environment is regulated to have a substantially constant temperature.

34. A method according to any one of aspects 1 to 33 or any other aspect herein wherein heating the mirror blank assembly to fuse the interposed glass splines to the primary glass and the backing glass comprises heating the mirror blank assembly to a temperature just below their melting temperature and heat-soaking the primary glass, the backing glass and the interposed glass splines at this temperature.

35. A method according to any one of aspects 1 to 34 or any other aspect herein wherein heating the mirror blank assembly to fuse the interposed glass splines to the primary glass and the backing glass comprises, for each glass spline, fusing the first surface of the glass spline to the primary planar surface of the primary glass and fusing the second surface of the glass spline to the backing planar surface of the backing glass.

36. A method according to any one of aspects 1 to 35 or any other aspect herein wherein heating the mirror blank assembly to fuse the interposed glass splines to the primary glass and the backing glass comprises allowing the weight of at least one of primary glass, the backing glass and the interposed glass splines to assist with the fusing the of the interposed glass splines to the primary glass and the backing glass.

37. A mirror blank fabricated according to the method of any one of aspects 1 to 36.

38. A monolithic glass mirror blank comprising:
a primary portion and a backing portion spaced apart from one another;
a plurality of spline portions extending between the primary portion and the backing portion;
wherein, for each spline portion, a first surface of the spline portion is fused to the primary portion and a second surface of the spline portion, the second surface opposed to the first surface, is fused to the backing portion;
wherein the plurality of spline portions are arranged to be circularly symmetric about an axis of symmetry and to extend in directions that are radial from the axis of symmetry; and
wherein, for each spline portion, a dimension $l_1$ of the radial extension of the first surface which abuts the primary portion is greater than a dimension $l_2$ of the radial extension of the second surface which abuts the backing portion.

39. A mirror blank according to aspect 38 or any other aspect herein wherein the primary portion, the backing portion and the splines portions have thermal coefficients that are the same +/−5%.

40. A mirror blank according to any one of aspects 38 to 39 or any other aspect herein wherein the primary portion, the backing portion and the spline portions have the same thermal coefficients.

41. A mirror blank according to any one of aspects 38 to 40 or any other aspect herein wherein the primary portion has a primary circular perimeter having a primary diameter $d_1$ and the backing portion has a backing circular perimeter having a backing diameter $d_2$ and $d_1 > d_2$.

42. A mirror blank according to aspect 41 or any other aspect herein wherein the primary portion and the backing portion are aligned so that the axis of symmetry intersects the center of the primary circular perimeter and the backing circular perimeter.

43. A mirror blank according to any one or aspects 38 to 41 or any other aspect herein wherein each of the spline portions has a first height dimension x in a direction extending between the primary portion and the backing portion at a side of the spline portion closest to the axis of symmetry and a second height dimension y in the direction extending between the primary portion and the backing portion at a side of the spline portion most distal from the axis of symmetry and where y<x.

44. A mirror blank according to aspect 43 or any other aspect herein wherein the primary portion has a primary circular perimeter having a primary diameter $d_1$ and wherein, for each spline portion, the first height dimension x is in a range between ½ to 1/20 of the primary diameter $d_1$.

45. A mirror blank according to any one of aspects 43 to 44 or any other aspect herein wherein the primary portion has a primary circular perimeter having a primary diameter $d_1$ and wherein, for each spline portion, the first height dimension x is in a range between ⅙ to 1/10 of the primary diameter $d_1$.

46. A mirror blank according to any one of aspects 38 to 45 or any other aspect herein wherein the primary portion is shaped to provide a primary opening therethrough.

47. A mirror blank according to aspect 46 or any other aspect herein wherein the primary portion is aligned such that the axis of symmetry extends through a center of the primary opening.

48. A mirror blank according to any one of aspects 46 to 47 or any other aspect herein wherein the primary opening has a circular perimeter.

49. A mirror blank according to any one of aspects 38 to 48 or any other aspect herein wherein the backing portion is shaped to provide a backing opening therethrough.

50. A mirror blank according to aspect 49 or any other aspect herein wherein the backing portion is aligned such that the axis of symmetry extends through a center of the backing opening.

51. A mirror blank according to any one of aspects 49 to 50 or any other aspect herein wherein the backing opening has a circular perimeter.

52. A mirror blank according to any one of aspects 38 to 51 or any other aspect herein wherein the glass spline portions are arranged about the axis of symmetry to have equal angular spacing between circumferentially adjacent pairs of spline portions.

53. A mirror blank according to any one of aspects 38 to 52 or any other aspect herein wherein the plurality of spline portions are located such that portions of circumferentially adjacent spline portions closest to the axis of symmetry contact one another at locations spaced apart from the axis of symmetry.
54. A mirror blank according to any one of aspects 38 to 53 or any other aspect herein wherein the plurality of spline portions are located such that portions of the spline portions closest to the axis of symmetry are spaced apart from the axis of symmetry and from one another.
55. A mirror blank according to aspect 54 or any other aspect herein wherein the plurality of spline portions are located such that the portions of the spline portions closest to the axis of symmetry are spaced apart from the axis of symmetry by a radial dimension that is the same for each spline portion.
56. A mirror blank according to any one of aspects 54 to 55 or any other aspect herein comprising a connector portion between the primary portion and the backing portion, a first surface of the connector portion fused to the primary portion and a second surface of the connector portion fused to the backing portion.
57. A mirror blank according to aspect 56 or any other aspect herein wherein the connector portion is shaped to define a bore therethrough and at least a portion of the bore extends between the primary portion and the backing portion.
58. A mirror blank according to aspect 57 or any other aspect herein wherein the connector portion is shaped to define at least a portion of one or more venting apertures which permit fluid communication between the bore of the connector portion and a region outside of the bore of the connector portion.
59. A mirror blank according to aspect 58 or any other aspect herein wherein the one or more venting apertures are defined in part by at least one of the primary portion and the backing portion.
60. A mirror blank according to any one of aspects 56 to 59 or any other aspect herein wherein the connector portion comprises a cylindrical outer surface having a cylindrical axis aligned with the axis of symmetry and, for each spline portion, a surface of the spline portion closest to the axis of symmetry is fused to the cylindrical outer surface of the connector portion.
61. A mirror blank according to any one of aspects 38 to 60 or any other aspect herein comprising a plurality of brace portions interposed between the plurality of spline portions, wherein, for each glass brace, opposing surfaces of the glass brace are fused to each of a corresponding pair of circumferentially adjacent glass splines.
62. A mirror blank according to aspect 61 or any other aspect herein wherein the brace portions are curved.
63. A mirror blank according to aspect 61 or any other aspect herein wherein the brace portions are generally straight and, for each brace portion, the opposing surfaces of the brace portion are bevelled with respect to the straight dimension of the brace portion.
64. A mirror blank according to any one of aspects 61 to 63 or any other aspect herein wherein each brace portion is fused to the primary portion.
65. A mirror blank according to any one of aspects 61 to 64 or any other aspect herein wherein each brace portion is fused to the backing portion.
66. A mirror blank according to any one of aspects 38 to 65 or any other aspect herein wherein the primary portion comprises a pair of glass layers having complementary surfaces fused to one another, at least one of the complementary surfaces comprising a plurality of channels.
67. A mirror blank according to aspect 66 or any other aspect herein wherein at least one of the plurality of channels extends between peripheral edges of the at least one of the complementary surfaces of the pair of glass layers.
68. A method for manufacturing a mirror blank assembly comprising:
providing a primary piece of glass comprising a primary planar surface and a backing piece of glass comprising a backing planar surface; and
assembling a mirror blank assembly, wherein assembling the mirror blank assembly comprises interposing a plurality of glass splines between the primary glass and the backing glass, wherein interposing the plurality of glass splines comprises:
for each glass spline, abutting a first surface of the glass spline against the primary planar surface of the primary glass and abutting a second surface of the glass spline, the second surface opposed to the first surface, against the backing planar surface of the backing glass; and
arranging the plurality of glass splines to be circularly symmetric about an axis of symmetry that is orthogonal to the primary planar surface and the backing planar surface and to extend in directions that are radial from the axis of symmetry; and
wherein, for each glass spline, a dimension $l_1$ of the radial extension of the first surface which abuts the primary planar surface of the primary glass is greater than a dimension $l_2$ of the radial extension of the second surface which abuts the backing planar surface of the backing glass.
69. A method for assembling a mirror blank assembly comprising any of the steps of aspects 1 to 37.
70. A mirror blank assembly assembled according to any one of the methods of aspects 68 to 69.
71. Methods comprising any features, combinations of features and/or sub-combinations of features disclosed herein.
72. Apparatus comprising any features, combinations of features and/or sub-combinations of features disclosed herein.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Aspects of the invention provide mirror blank assemblies. In some embodiments, the mirror blank assembly is large (e.g. 18" and greater in diameter) and lightweight. In some embodiments, a mirror blank assembly comprises a plurality of separate components which are assembled relative to one another but which are not yet fused or otherwise attached to one another. A mirror blank assembly may be assembled as a part of a method for manufacturing a mirror blank. Aspects of the invention provide methods for manufacturing a mirror blank which comprise assembling a mirror blank assembly and then heating the mirror bank assembly to fuse its components to one another and to thereby provide a monolithic (i.e. one piece) mirror blank. Aspects of the invention provide mirror blanks manufactured by such methods.

Figure 1:
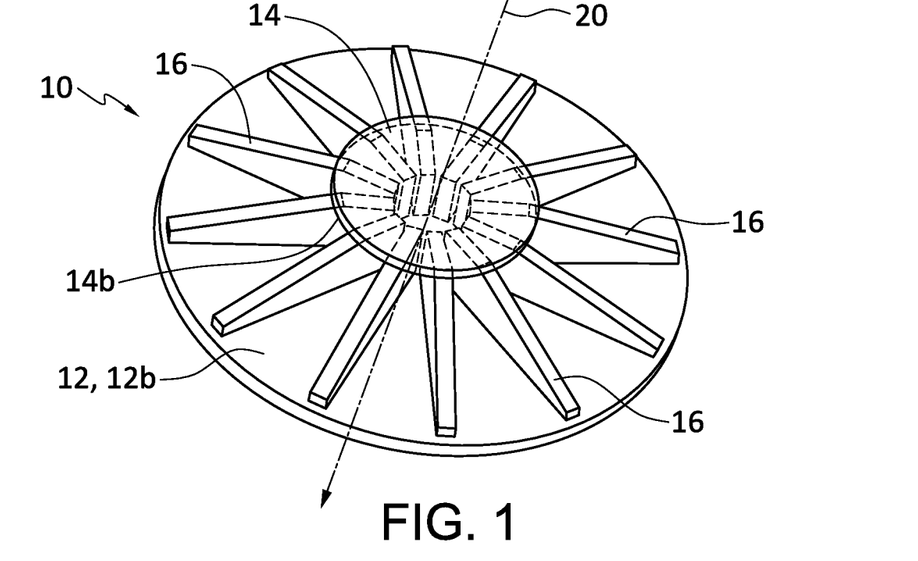
FIG. 1 depicts a mirror blank assembly according to a particular embodiment.

FIG. 1 depicts a mirror blank assembly 10 according to a particular embodiment. Mirror blank assembly 10 of the FIG. 1 embodiment comprises a primary piece of glass 12 (which may be referred to herein as primary glass 12), a backing piece of glass 14 (which may be referred to herein as backing glass 12) and a plurality of glass splines 16 which may be interposed between primary glass 12 and backing glass 14.

Figure 2:
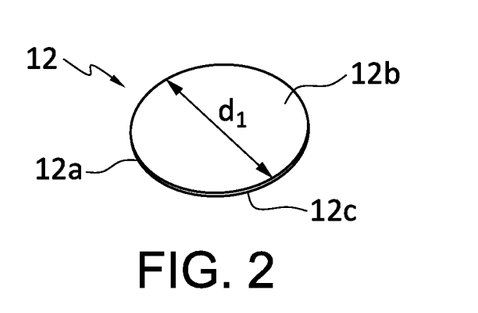
FIG. 2 depicts the primary glass of the FIG. 1 mirror blank assembly.

As shown in FIG. 2, primary glass 12 comprises a primary planar (e.g. flat) surface 12b. Grinding, polishing, molding or otherwise making planar surface 12b relatively smooth (e.g. relatively free from bumps or indentations) may help to avoid the formation of bubbles between primary planar surface 12b and abutting surfaces (e.g. abutment surfaces 16a) of glass splines 16 during heating (as described below). In the illustrated embodiment of FIG. 2, primary glass 12 is generally disc-shaped with a generally planar opposing surface 12c (i.e. opposed to primary planar surface 12b), a circular perimeter with a diameter $d_1$ and a circumferential edge 12a. Circumferential edge 12a may extend between primary planar surface 12b and opposing surface 12c with a uniform thickness $t_1$ and may be oriented orthogonally to both primary planar surface 12b and opposing surface 12c. The thickness $t_1$ of primary glass 12 may depend on the diameter $d_1$ of primary glass 12 (e.g. a greater thickness $t_1$ may be desirable to support a greater diameter $d_1$), but is not necessarily so. In some embodiments, primary glass 12 may have other shapes. By way of non-limiting example: opposing surface 12c need not be flat or planar and may have other surface shapes; the perimeter shape of primary glass 12 may be other than circular; circumferential edge 12a may be angled, beveled or rounded; the thickness $t_1$ may vary around the perimeter of primary glass 12; and/or the like.

Figure 3:
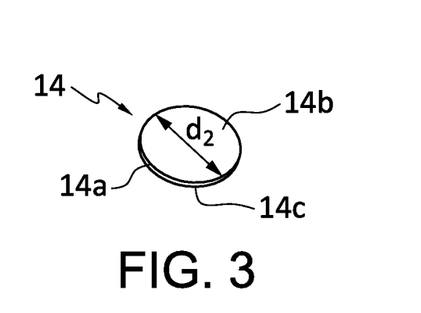
FIG. 3 depicts the backing glass of the FIG. 1 mirror blank assembly.

Backing glass 14 is shown best in FIG. 3. In the illustrated embodiment, backing glass 14 is generally disc-shaped with a generally planar opposing surface 14c (i.e. opposed to backing planar surface 14b), a circular perimeter with a diameter $d_2$ and a circumferential edge 14a. Circumferential edge 14a may extend between backing planar surface 14b and opposing surface 14c with a uniform thickness $t_2$ and may be oriented orthogonally to both backing planar surface 14b and opposing surface 14c. The thickness $t_2$ of backing glass 14 may depend on the diameter $d_2$ of backing glass 14 (e.g. a greater thickness $t_2$ may be desirable to support a greater diameter $d_2$), but is not necessarily so. In some embodiments, backing glass 14 may have other shapes. By way of non-limiting example: opposing surface 14c need not be flat or planar and may have other surface shapes; the perimeter shape of backing glass 14 may be other than circular; circumferential edge 14a may be angled, beveled or rounded; the thickness $t_2$ may vary around the perimeter of backing glass 14; and/or the like.

In some embodiments, such as the illustrated embodiment, the diameter $d_2$ of backing glass 14 is smaller than the diameter $d_1$ of primary glass 12 (i.e. $d_2 < d_1$). In some embodiments, diameter $d_2$ is approximately half of diameter $d_1$.

As depicted in FIG. 1, mirror blank assembly 10 comprises a plurality of glass splines 16. The number of glass splines 16 can vary for different embodiments. In some cases, as the diameter of mirror blank assembly 10 (e.g. the diameter $d_1$ of primary glass 12 and/or the diameter $d_2$ of backing glass 14) increases, it may be beneficial to increase the number of glass splines 16. In particular, some embodiments comprise between 3 and 20 glass splines 16; and some embodiment comprise between 8 and 16 glass splines. FIG. 1 depicts an embodiment having 12 glass splines 16. In the illustrated embodiment, glass splines 16 all have substantially the same size and shape, although this is not necessary. In some embodiments, some glass splines 16 may have different sizes and/or shapes that other glass splines 16.

Figure 4:
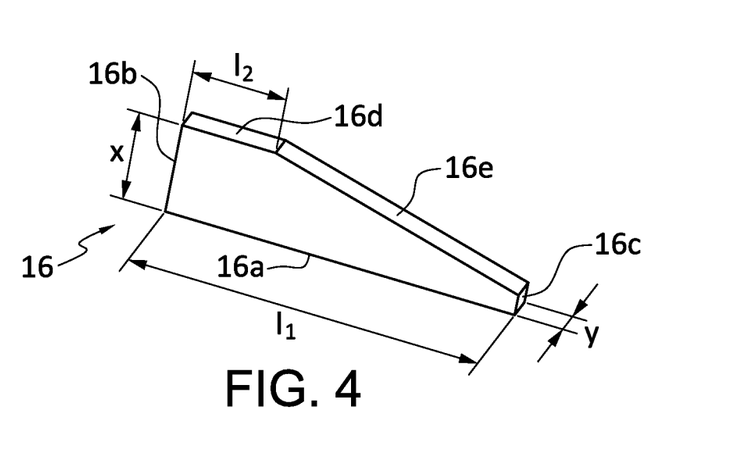
FIG. 4 depicts a glass spline of the FIG. 1 mirror blank assembly.

Glass splines 16 of the FIG. 1 mirror blank assembly 10 are shown best in FIG. 4. Glass spline 16 of the FIG. 3 embodiment comprises a substantially planar (e.g. flat) abutment surface 16a which (as explained in more detail below) may abut against primary planar surface 12b of primary glass 12 in mirror blank assembly 10. Opposing sides 16b and 16c extend from opposing ends of abutment surface 16a. Abutment surface 16a may have a dimension $l_1$ between opposing sides 16b, 16c. In some embodiments, opposing sides 16b and 16c extend parallel to each other and generally orthogonally to abutment surface 16a. In other embodiments, opposing sides 16b and 16c may extend in different directions (e.g. at different angles) from one another and/or relative to abutment surface 16a. In the illustrated embodiment, side 16b has dimension x (in a direction orthogonal from planar abutment surface 16a) and side 16c has dimension y (in the direction orthogonal to planar abutment surface 16a). Without loss of generality, these dimensions x, y may be referred to herein as height dimensions, it being understood that unless the context dictates otherwise the word height is merely a convenient label for these dimensions to distinguish them from other dimensions of interest. Glass spline 16 of the illustrated embodiment also comprises a substantially planar (e.g. flat) opposing abutment surface 16d. Opposing abutment surface 16d extends, generally parallel and opposite to abutment surface 16a, from side 16b toward side 16c. Opposing abutment surface may have a dimension $l_2$ in a direction aligned with dimension $l_1$ of abutment surface 16a. In the illustrated embodiment, y<x and $l_2$<$l_1$. In embodiments where $l_2$<$l_1$, glass spline 16 may comprise an additional surface 16e which extends from opposing abutment surface 16d to side 16c. In some embodiments, it is possible to have $l_2$<$l_1$ because the diameter $d_2$ of backing glass 14 (and its planar backing surface 14b) is less than the diameter $d_1$ of primary glass 12 (and its planar primary surface 12b). Having $l_2$<$l_1$ and/or $d_2$<$d_1$ advantageously reduces the weight of mirror blank assembly 10 and mirror blanks formed therefrom. However, providing $l_2$<$l_1$ is not necessary. In some embodiments, height x is equal to height y, opposing abutment surface 16d extends all the way from side 16b to side 16c and the dimensions $l_1$=$l_2$. Where the dimensions x=y and $l_1$=$l_2$, glass spline 16 is a rectangular prism. In some embodiments, height x is approximately ½ to ¹⁄₂₀ of diameter $d_1$ of primary glass 12. In other embodiments, height x is ⅙ to ¹⁄₁₀ of diameter $d_1$ of primary glass 12.

As depicted in FIG. 1, mirror blank assembly 10 may be assembled by interposing glass splines 16 between primary glass 12 and backing glass 14. Interposing glass splines 16 between primary glass 12 and backing glass 14 may comprise respectively abutting abutment surfaces 16a, 16d of glass splines 16 against planar surfaces 12b, 14b of primary glass 12 and backing glass 14. In this manner, glass splines 16 may support backing glass 14 relative to primary glass 16 (or vice versa) and may maintain the spaced apart relationship between backing glass 14 and primary glass 16. In mirror blank assembly 10 of the FIG. 1 embodiment, respective planar surfaces 12b, 14b are facing one another, parallel to one another and spaced apart from one another.

Mirror blank assembly 10 of the FIG. 1 embodiment is circularly symmetric about an axis of symmetry 20. Axis of symmetry 20 may be orthogonal to planar surfaces 12b, 14b of primary glass 12 and secondary glass 14, although this is not necessary. Axis of symmetry 20 may extend through a center of primary glass 12 and a center of backing glass 14 (e.g. through the centers of their respective circular perimeters), although this is not necessary. In some embodiments, glass splines 16 may be arranged relative to each other and/or relative to primary glass 12 and backing glass 14, such that glass splines 16 are circularly symmetric about symmetry axis 20. In some embodiments, glass splines 16 are arranged to extend in radial directions from symmetry axis 20 (although, as shown in FIG. 1, each glass spline 16 need not extend all the way to symmetry axis 20). In some embodiments, glass splines 16 are arranged to extend in radial directions which extend between a circular perimeter of primary glass 12 and symmetry axis 20. In some embodiments, each pair of adjacent (e.g. circumferentially adjacent) glass splines 16 may be angularly spaced apart from one another. In some embodiments, each pair of adjacent glass splines 16 may have at least approximately equal angular spacing.

In the FIG. 1 embodiment, glass splines 16 are interposed between primary glass 12 and backing glass 14 such that the portions of circumferentially adjacent glass splines 16 closest to symmetry axis 20 (e.g. the edges of sides 16b) contact one another. These portions of circumferentially adjacent glass splines 16 closest to symmetry axis 20 may contact one another at locations that are spaced apart from symmetry axis 20. This contact between circumferentially adjacent glass splines 16 is not necessary. In some embodiments, glass splines 16 are located such that the portions of the glass splines 16 closest to symmetry axis 20 are spaced apart from symmetry axis 20 and/or from one another. In some embodiments, the portions of glass splines that are closest to symmetry axis 20 may be spaced apart from symmetry axis 20 by a radial dimension that is the same for each glass spline 16.

In mirror blank assembly 10 of the FIG. 1 embodiment, backing glass 14 is generally spaced apart from primary glass 12 by interposed glass splines 16 by a distance x, equal to the height of side 16b which is closest to the axis of symmetry or equal to the space between parallel abutment surfaces 16a, 16d of glass splines 16. Backing glass 14 may overhang planar surfaces 16d of glass splines 16, may be aligned with the outer ends of planar surfaces 16d (as is the case in the FIG. 1 embodiment) or may not reach the radially outer edges of abutment surfaces 16d.

Figure 5:
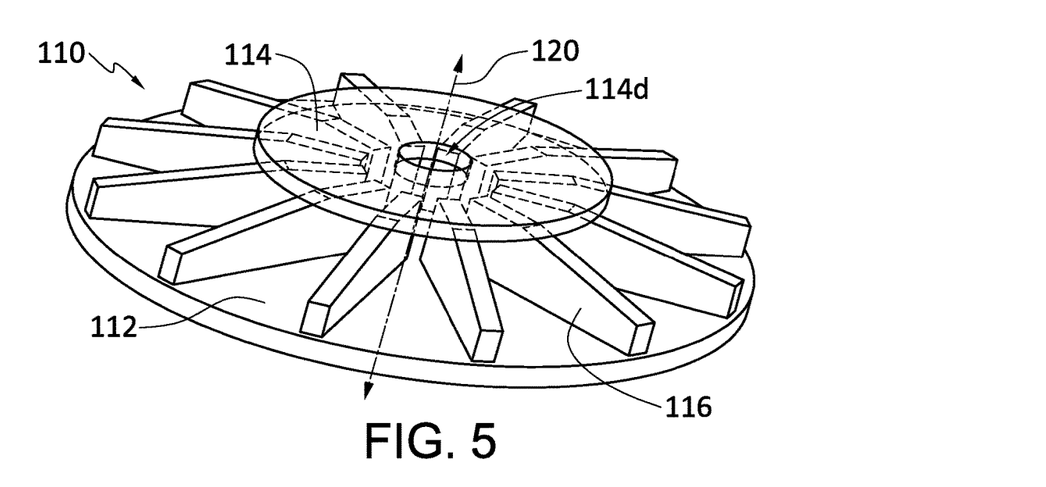
FIG. 5 depicts a mirror blank assembly according to another embodiment.
Figures 6, 7:
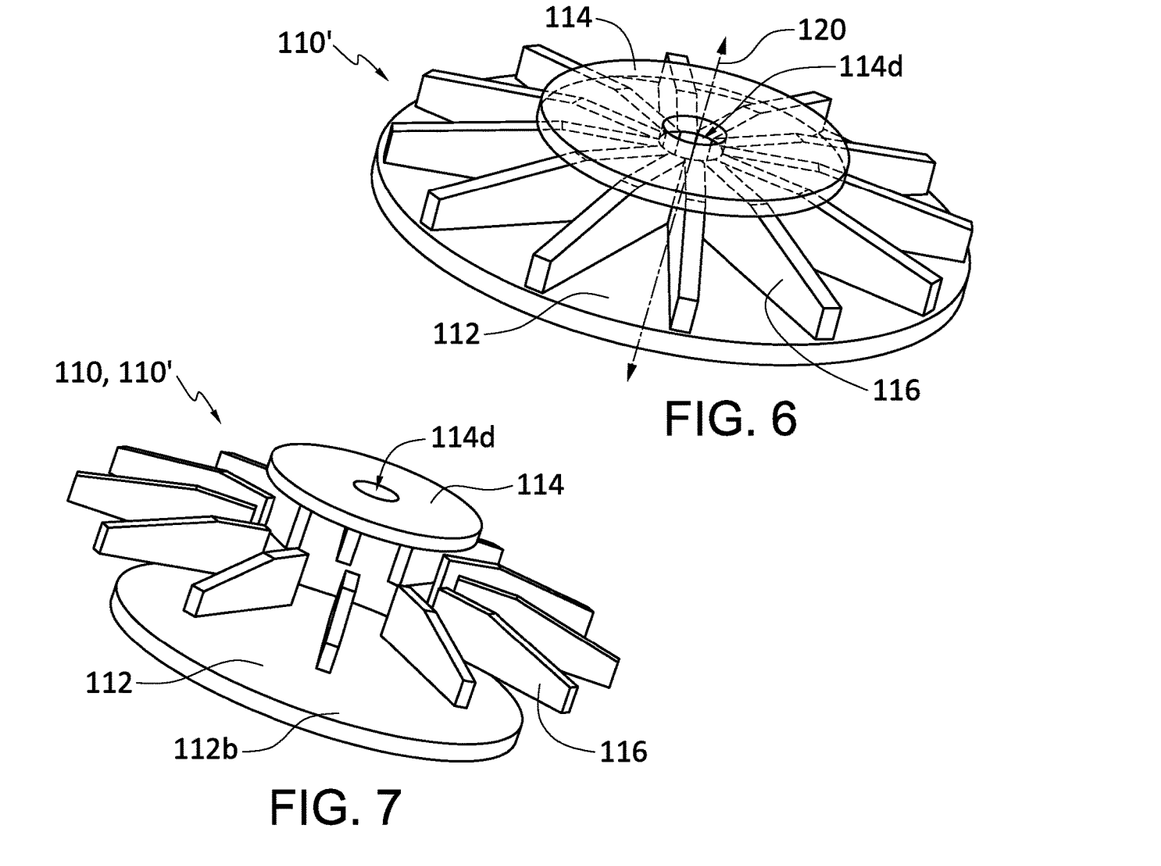
FIG. 6 depicts a mirror blank assembly according to another embodiment.
FIG. 7 depicts an exploded view of either of the FIG. 5 or FIG. 6 mirror blank assemblies.

FIG. 5 depict a mirror blank assembly 110 according to a particular embodiment. FIG. 6 depicts a mirror blank assembly 110' according to a particular embodiment. FIG. 7 depicts an exploded view of either of mirror blanks 110, 110'. Mirror blank assemblies 110, 110' are generally similar to mirror blank assembly 10 described elsewhere herein and similar reference numerals are used to describe features of mirror blank assemblies 110, 110' which are similar to those of mirror blank assembly 10, except that the reference numerals for mirror blank assemblies 110, 110' are preceded with the digit "1". Mirror blank assemblies 110, 110' differ primarily from mirror blank assembly 10 in that backing glass 114 of both mirror blank assemblies 110, 110' is shaped to define a backing opening 114d. In some embodiments, backing opening 114d has a circular perimeter. In other embodiments, backing opening 114d may have a differently shaped perimeter. Backing opening 114d may be shaped and/or located, such that symmetry axis 120 passes through a center of backing opening 114d. Backing opening 114d may be of any diameter that allows for a sufficient amount of contact between abutment surfaces 116d of each of the plurality of glass splines 116 and planar surface 114b of backing glass 114. Backing opening 114d reduces the weight of mirror blank assemblies 110, 110' and provides a fluid communication channel which may provide ventilation and/or improve heat transfer during the heating of mirror blank assemblies 110, 110'.

The components of mirror blank assemblies 110, 110' (e.g. primary glass 112, backing glass 114 and glass splines 116) are substantially similar to one another. Mirror blanks 110, 110' differ from one another primarily in that, when interposed between primary glass 112 and backing glass 114, glass splines 116 of mirror blank assembly 110 (FIG. 5) are located such that the portions of glass splines 116 closest to axis of symmetry 120 are spaced apart from one another, whereas glass splines 116 of mirror blank assembly 110' (FIG. 6) are located such that the portions of glass splines 116 closest to axis of symmetry 120 contact their circumferentially adjacent splines 116. In both the cases of mirror blank assembly 110 and mirror blank assembly 110', the portions of glass splines 116 closest to axis of symmetry 120 are located at a generally constant radial distance from axis of symmetry 120.

Figure 8:
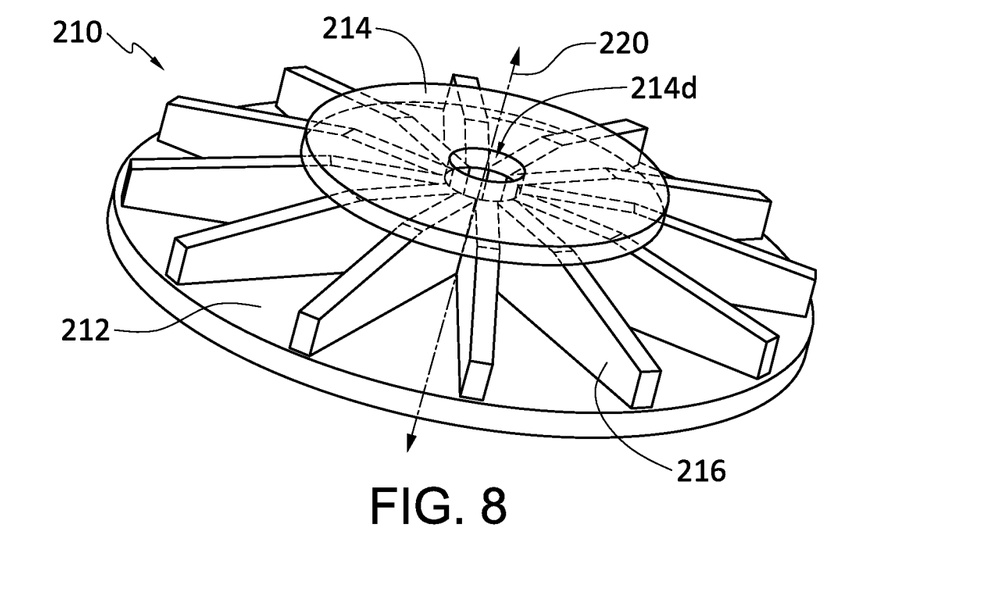
FIG. 8 depicts a mirror blank assembly according to another embodiment.
Figure 9:
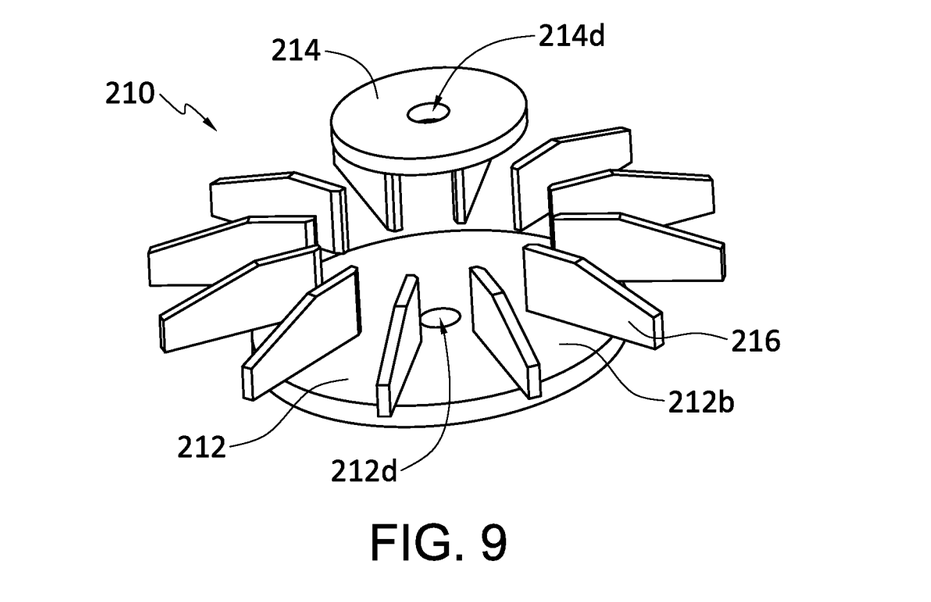
FIG. 9 depicts an exploded view of the FIG. 8 mirror blank assembly.

FIGS. 8 and 9 depict mirror blank assembly 210 according to a particular embodiment. Mirror blank assembly 210 is generally similar to mirror blank assemblies 10, 110, 110' described elsewhere herein and similar reference numerals are used to describe features of mirror blank assembly 210 which are similar to those of mirror blank assemblies 10, 110, 110', except that the reference numerals for mirror blank assembly 210 are preceded with the digit "2". Mirror blank assembly 210 differs from mirror blank assembly 110' in that primary glass 212 is shaped to define primary opening 212d. In some embodiments, primary opening 212d has a circular perimeter. In other embodiments, primary opening 212d may have a differently shaped perimeter. Primary opening 212d may be shaped and/or located, such that symmetry axis 220 passes through a center of primary opening 212d. Primary opening 212d may be of any diameter that allows for a sufficient amount of contact between abutment surfaces 216d of each of the plurality of glass splines 216 and planar surface 214b of backing glass 214 while meeting any requirements of an optical instrument for which mirror blank assembly 210 is being made. Primary opening 214d reduces the weight of mirror blank assembly 210 and provides a fluid communication channel which may provide ventilation and/or improve heat transfer during the heating of mirror blank assembly 210.

Like mirror blank assemblies 110, 110', mirror blank assembly 210 of the illustrated embodiment, comprises backing glass 214 shaped to define backing opening 214d which may comprise features substantially similar to backing opening 114d of mirror blank assemblies 110, 110' described elsewhere herein. However, backing opening 214d is not necessary and, in some embodiments, mirror blank assembly 210 may be provided without backing opening 214d. In the illustrated embodiment, mirror blank assembly 210 has its glass splines 216 located so that the portions of glass splines closest to symmetry axis 220 contact one another (in a manner similar to that of mirror blank assembly 110' (FIG. 6). This is not necessary. In some embodiments, mirror blank assembly 210 may be assembled such that its glass splines 216 are located such that the portions of glass splines 216 located closest to symmetry axis 220 are spaced apart from one another (in a manner similar to that of mirror blank assembly 110 (FIG. 5)).

Figure 10:
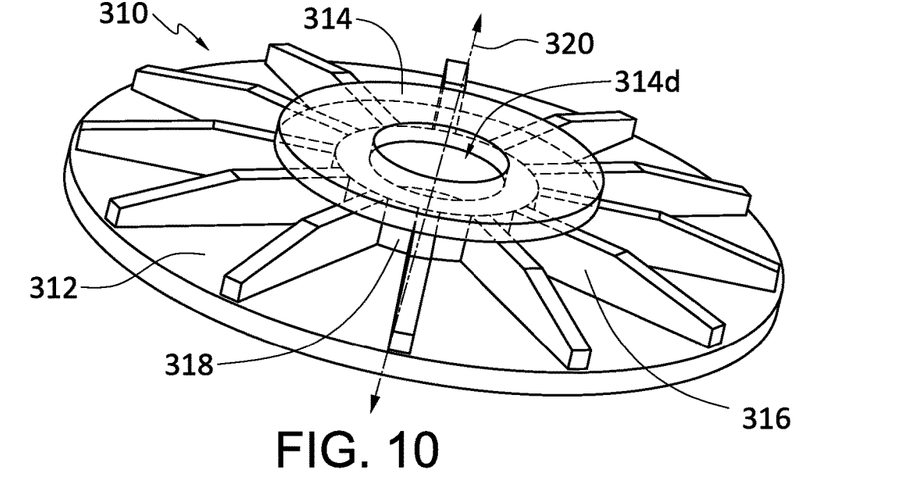
FIG. 10 depicts a mirror blank assembly according to another embodiment.
Figure 11:
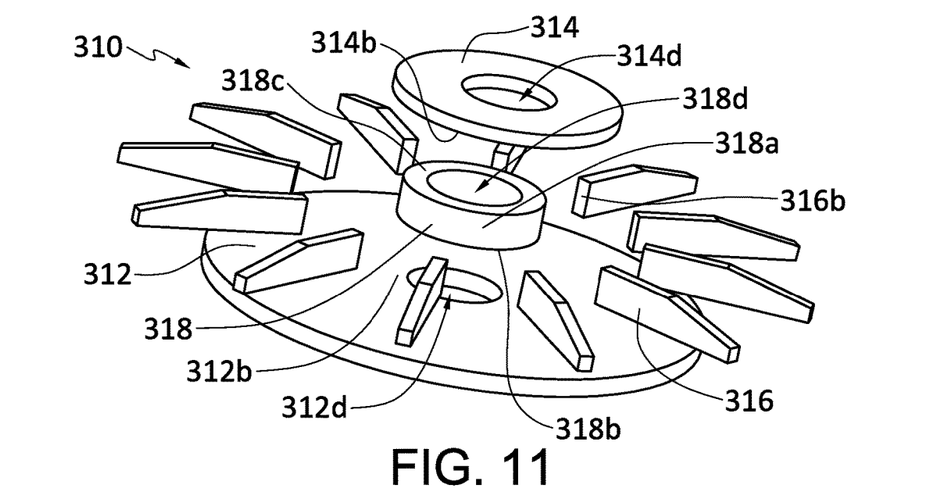
FIG. 11 depicts an exploded view of the FIG. 10 mirror blank assembly.

FIGS. 10 and 11 depict mirror blank assembly 310 according to a particular embodiment. Mirror blank assembly 310 is generally similar to mirror blank assemblies 10, 110, 110', 210 described elsewhere herein and similar reference numerals are used to describe features of mirror blank assembly 310 which are similar to those of mirror blank assemblies 10, 110, 110', 210, except that the reference numerals for mirror blank assembly 310 are preceded with the digit "3". Mirror blank assembly 310 differs from mirror blank assembly 210 in that mirror blank assembly comprises a connector 318 (e.g. a generally tubular connector 318) which is interposed between primary glass 312 and backing glass 314. Interposing connector 318 between primary glass 312 and backing glass 314 may comprise abutting first and second opposed abutment surfaces 318b, 318c against planar surfaces 312b, 314b of primary glass 312 and backing glass 314. In the illustrated embodiment, connector 318 comprises a cylindrical outer surface 318a. In some embodiments, the cylindrical outer surface 318a of connector 318 may have a cylindrical axis that is co-axial with (or otherwise aligned with) axis of symmetry 320. In the illustrated embodiment, connector 318 is shaped to define a bore 318d that extends therethrough. In some embodiments, at least a portion of bore 318d extends between the planar surfaces 312b, 314b of primary glass 312 and backing glass 314. In the FIG. 10 embodiment, portions of glass splines 316 closest to symmetry axis 320 (e.g. sides 316b) abut against outer surface 318a of connector 318. This is not necessary. In some embodiments, glass splines 316 may be located to be spaced apart from connector 318. Connector 318 may provide additional strength to mirror blank assembly 310 by providing increased surface area in the connections between primary glass 312, glass splines 16 and backing glass 314.

Like mirror blank assembly 210, mirror blank assembly 310 of the illustrated embodiment, comprises backing glass 314 shaped to define backing opening 314d and primary glass 312 shaped to define primary opening 312d. The features of backing opening 314d and primary opening 312d may be substantially similar to backing opening 214d and primary opening 214d of mirror blank assembly 210 described elsewhere herein. However, neither backing opening 314d nor primary opening 312d is necessary. In some embodiments, mirror blank assembly 310 may be provided without backing opening 314d and/or without primary opening 312d.

Figure 12:
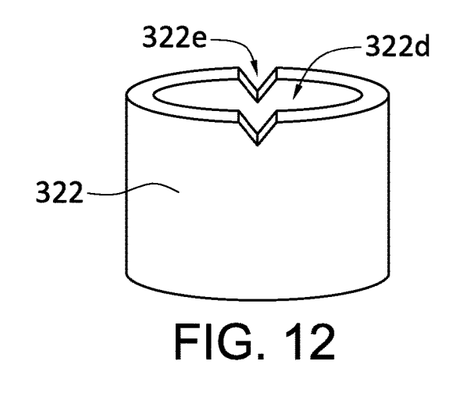
FIG. 12 depicts a connector which may be used with the FIG. 10 mirror blank assembly or any of the other mirror blank assemblies described herein.

In some embodiments of mirror blank assembly 310, especially where primary glass 312 does not include a primary opening 312d and/or backing glass 314 does not include a backing opening 314d, a modified connector 322 may replace connector 318. Connector 322, as depicted in FIG. 12, includes one or more venting aperture 322e to allow fluid communication between bore 322d and a region outside of bore 322d when connector 322 is interposed between primary glass 312 and backing glass 314. In the illustrated embodiment, venting apertures are defined in part by the concave feature 322e in connector 322 and in part by one or both of planar surfaces 312b, 314b. This is not necessary. In some embodiments, venting apertures may be additionally or alternatively defined completely by connector 322. Connector 322 of the FIG. 12 embodiment may be used even in embodiments, where mirror blank assembly 310 include primary opening 312d or backing opening 314d (such as in the illustrated embodiment of FIGS. 10 and 11).

Figure 13:
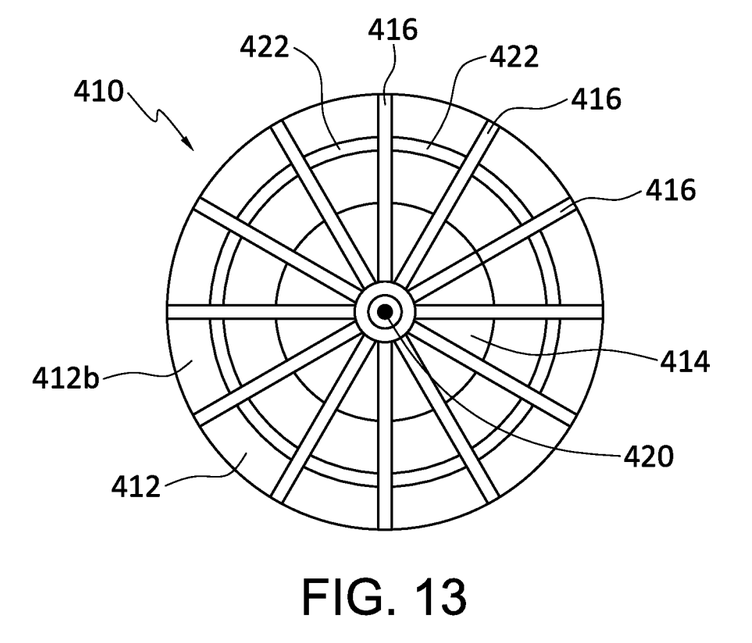
FIG. 13 depicts a mirror blank assembly according to another embodiment.
Figure 14:
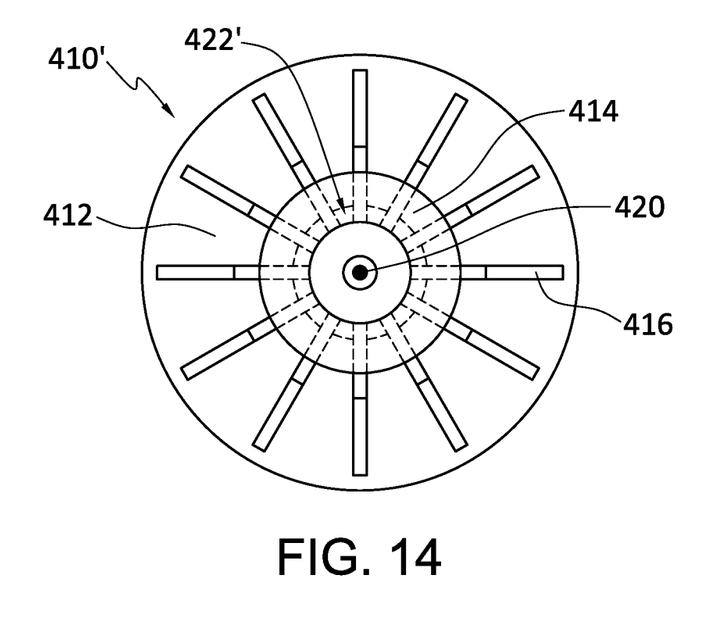
FIG. 14 depicts a mirror blank assembly according to another embodiment.

FIGS. 13 and 14 depict schematic views of mirror blank assemblies 410, 410' according to particular embodiments. Mirror blank assemblies 410, 410' are generally similar to mirror blank assemblies 10, 110, 110', 210, 310 described elsewhere herein and similar reference numerals are used to describe features of mirror blank assemblies 410, 410' which are similar to those of mirror blank assemblies 10, 110, 110', 210, 310, except that the reference numerals for mirror blank assemblies 410, 410' are preceded with the digit "4". Mirror blank assemblies 410, 410' differ from mirror blank assemblies 10, 110, 110', 210, 310 primarily in that mirror blank assemblies 410, 410' respectively comprise glass braces 422, 422' interposed between and abutting against circumferentially adjacent pairs of glass splines 416. In the illustrated embodiment, glass braces 422, 422' are arranged to abut against each circumferentially adjacent pair of glass splines 416, although this is not necessary and, in some embodiments, glass braces 422, 422' could be arranged to abut against one or more selected pairs of circumferentially adjacent glass splines 416.

Glass braces 422, 422' may be straight (having a pair of opposed planar surfaces) with opposing edge surfaces that are beveled with respect to the planar surfaces, for abutting circumferentially adjacent glass splines 16. Additionally or alternatively, glass braces 422, 422' may be curved with opposing edge surfaces that are beveled or non-beveled for abutting against circumferentially adjacent glass splines 416, as illustrated in FIG. 13. Glass braces 422, 422' may be interposed between primary glass 412 and backing glass 414. Glass braces 422, 422' may abut either or both of primary planar surface 412b and backing planar surface 414c, although this is not necessary. Glass braces 422' may be arranged relatively close to axis of symmetry 420 to space apart circumferentially adjacent glass splines 16, as illustrated in FIG. 14. Since glass braces 422' are located within a distance $d_2/2$ from axis of symmetry 420, glass braces 422' may abut against (and be subsequently fused to) the planar surfaces 412b, 414b of both primary glass 412 and backing glass 414. Glass braces 422 may additionally or alternatively be arranged further from axis of symmetry 420, as illustrated in FIG. 13. Since braces 422 are located at distances greater than $d_2/2$ from axis of symmetry 420, braces 422 may abut against (and be subsequently fused to) only the planar surface 412b of primary glass 412. In some embodiments, glass braces 422, 422' may include venting notches (e.g. similar to notch 322e of connector 322), apertures or the like for allowing air to escape from the center of mirror blank assembly 410. In some embodiments of mirror blank assembly 410, different glass braces 422, 422' may be located at different radial distances from the axis of symmetry. In others, all glass braces 422, 422' may be equidistant from the axis 420 of mirror blank assembly 410.

Figure 15:
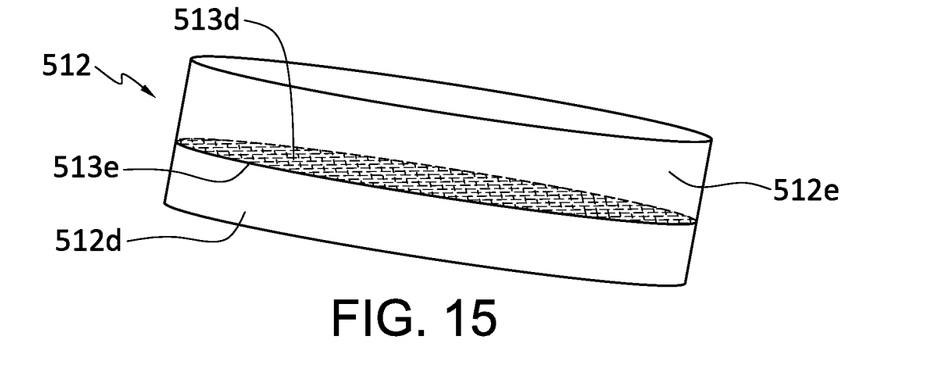
FIG. 15 depicts a pair of glass layers used to provide a primary glass according to a particular embodiment.
Figure 16:
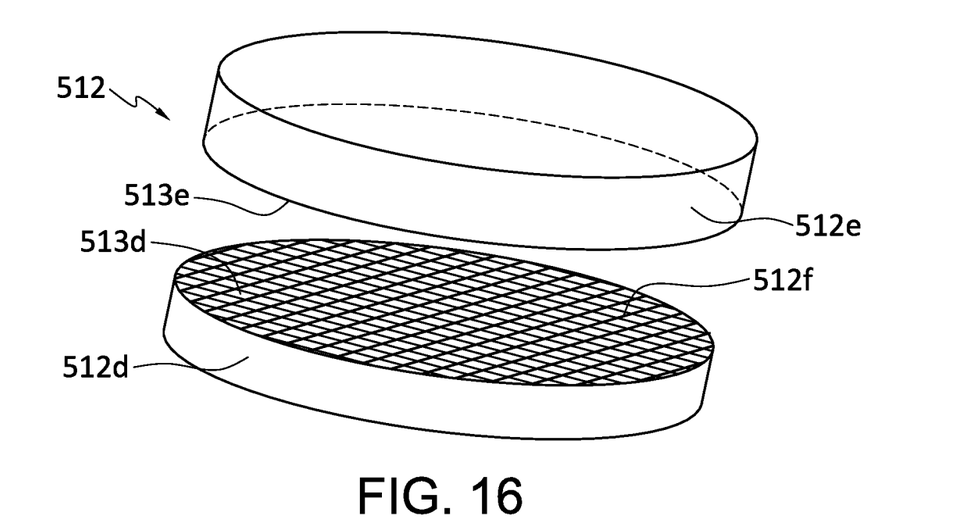
FIG. 16 depicts an exploded view of the FIG. 15 pair of glass layers.

In some situations, primary glass 12 may only be conveniently available (e.g. to fabricate, to transport and/or to purchase) in a limited variety of thicknesses. To achieve a desired thickness $t_1$, two or more layers 512d, 512e of primary glass may be joined together as illustrated in FIGS. 15 and 16 to form primary glass 512. For example, if primary glass layers 512d, 512e are only conveniently available with thicknesses of 6 mm and 8 mm, while the desired thickness of primary glass 512 is 14 mm, one 6 mm layer 512d can be fused to one 8 mm layer 512e.

Layers 512d and 512e may be fused by abutting their complementary surfaces 513d, 513e together and then applying heat to fuse layers 512d, 512e. In some embodiments, where layers 512d, 512e are part of a glass blank assembly, layers 512d, 512e may be heated and fused in the same step as the rest of the glass blank assembly. In other embodiments, layers 512d, 512e may be fused in a separate step. In the illustrated embodiment, complementary surfaces 513d, 513e of layers 512d, 512e are generally planar (e.g. flat), although this is not necessary. During the heating process, air bubbles may form between layers 512d, 512e (e.g. due to air trapped by the imperfections in the smoothness of complementary surfaces 513d, 513e. Such air bubbles may detrimentally impact the strength, hardness, shape and other properties of primary glass 512. To minimize the likelihood of air bubbles forming, complementary surfaces 513d, 513e of one or both of layers 512d, 512e may include one or more channels or grooves 512f for allowing air to escape from between layers 512d, 512e. In the illustrated embodiment of FIGS. 15-17, such channels 512f are provided complementary surface 513d of layer 512d. Channels 512f may comprise concavities in their corresponding complementary surface (e.g. in complementary surface 513d in the case of the illustrated embodiment). Channels 512f may comprise concavities that open toward the other layer (e.g. toward layer 512e in the case of the illustrated embodiment). In some embodiments, channels 512f are organized in a grid pattern with rows arranged perpendicular to columns, wherein the rows and columns extend to a peripheral edge of their respective complementary surface (e.g. to the peripheral edge of complementary surface 513d in the case of the illustrated embodiment). In some embodiments, channels 512f may be arranged in any pattern suitable for allowing air to escape to the circumferential edges of the primary glass 512.

Figure 17:
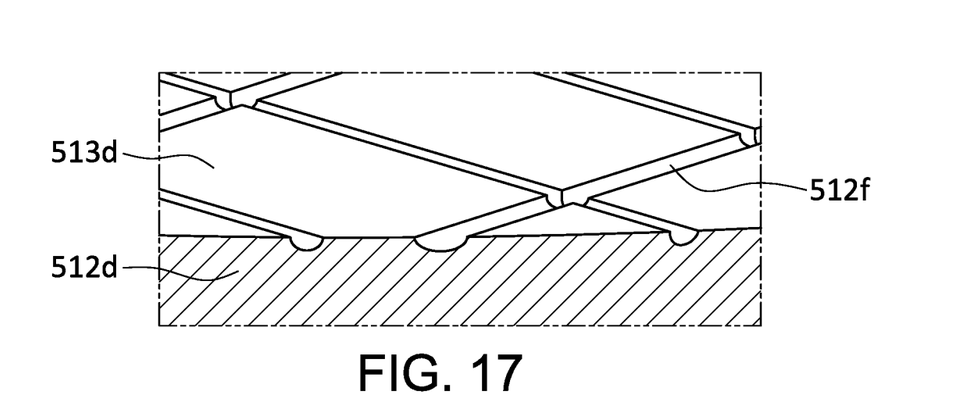
FIG. 17 depicts a magnified partial view of a surface of one of the FIG. 15 pair of glass layers.

Channels 512f may take any cross-sectional shape. In some embodiments, channels 512f are square in cross-section while in other embodiments, channels 512f are rounded in cross-section such as depicted in FIG. 17.

The components of mirror blank assemblies according to various embodiments (e.g. primary glass 12, backing glass 14, glass splines 16, connectors 318 and 320 and glass braces 422) may be made of the same type of glass or a variety of types of glass as long, as the various components can be fused together. In currently preferred embodiments, the glass used to fabricate the components of mirror blank assemblies have the same or similar thermal expansion coefficients. In particular, in some embodiments, primary glass 12, backing glass 14, glass splines 16, connectors 318 and 320 and glass braces 422 may have thermal expansion coefficients within +/−5% of each other. In some embodiments, these thermal expansion coefficients are within +/−15% of each other. In some embodiments, these thermal expansion coefficients are within +/−1% of each other. In some embodiments, glass 12, backing glass 14, glass splines 16, connectors 318 and 320 and glass braces 422 have the same thermal expansion coefficients.

An aspect of the invention provides methods for manufacturing mirror blanks. In some embodiments, the method is for manufacturing large (e.g. 18" and greater in diameter), lightweight mirror blanks.

In some embodiments, a first step is to assemble a mirror blank assembly. A mirror blank assembly may comprise a plurality of components as described above in relation to mirror blank assemblies 10, 110, 210, 310 and 410. The following method may be practiced with any of the mirror blank assemblies described above or any variation of the mirror blank assemblies comprising a combination of the features described above.

Figure 18:
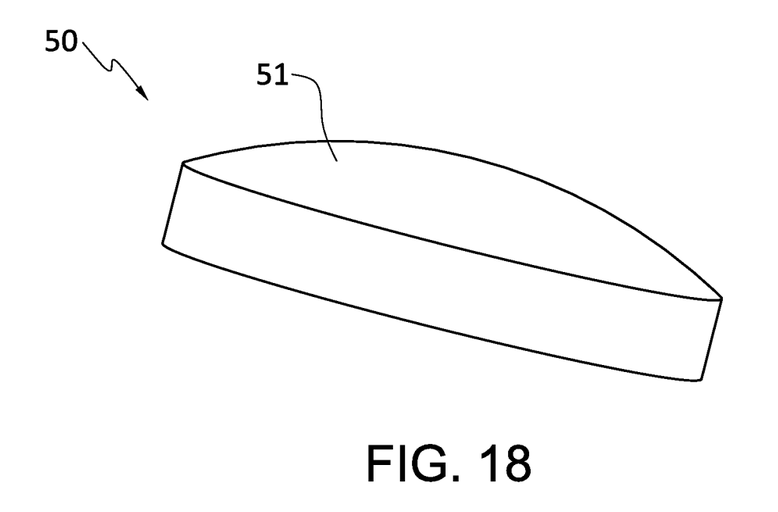
FIG. 18 depicts a spherically convex mold according to a particular embodiment.

After a mirror blank assembly (10, 110, 210, 310 or 410 for example) is assembled, the assembled mirror blank is heated to fuse the components together. In some embodiments, a kiln or a similar apparatus is used to heat the mirror blank assembly although other apparatus and/or methods for heating may be used to hear the mirror blank assembly. In some embodiments, the mirror blank assembly is placed in or on a mold such as mold 50, as illustrated in FIG. 18. In particular, in some embodiments, when the mirror blank assembly is placed in or on mold 50, the opposing surface of primary glass (e.g. opposing surface 12c of primary glass 12) is placed in contact with a mold surface 51 of mold 50. In some embodiments, mold 50 may comprise a spherical convex mold surface 51. In some embodiments, mold 50 may comprise a parabolic convex surface mold surface 51. Mold 50 (or at least mold surface 51) may be uniformly covered with a mold release agent prior to placing the mirror blank assembly in or on mold 50. The mold release agent may be sprayed on or applied such that mold surface 51 is coated with mold release agent. In some embodiments, the mold release agent may comprise aluminum powder or the like. If aluminum powder is applied, the aluminum powder may be allowed to harden. Mold 50, covered in aluminum powder, may be dried in a kiln. Mold surface 51 (with or without the mold release agent) should be relatively smooth (e.g. without significant indentations or bumps).

A mold together with the mirror blank assembly that is on or in the mold may together be placed in a kiln or the like for application of heat. The temperature of the kiln may raised to just below the molten temperature of glass (or some other suitable temperature) and the glass may be allowed to soak at this temperature. In some embodiments, this temperature is approximately 750° Celsius (+/−5%) and the mirror blank assembly is allowed to soak for 1-12 hours (e.g. approximately two hours) at this temperature. In some embodiments, the soaking time and temperature be different. While soaking, the contact surfaces of the individual components of the mirror blank assembly fuse together. In particular, abutment surfaces 16a, 16d of each of the plurality of splines 16 respectively fuse to primary planar surface 12b of primary glass 12 and backing planar surface 14b of backing glass 14. In some embodiments, the weight of the at least one of primary glass 12, backing glass 14 and glass splines 16 assists with the fusing of glass splines 16 to primary glass 12 and backing glass 14. In some embodiments, abutment surfaces 318b, 318c of a connector 318 may respectively fuse to primary planar surface 12b of primary glass 12 and backing planar surface 14b of backing glass 14. In some embodiments, surface 318a of connector 318 may fuse to glass splines. In some embodiments, surfaces of braces 422, 422' may similarly fuse to glass splines, to primary glass and/or to backing glass. While soaking, the primary glass may conform to mold surface 51 of mold 50 to take a shape complementary to the shape of mold surface 51. In particular embodiments, where mold surface 51 is spherically convex, primary glass takes a shape having a spherical concave curvature.

In some embodiments, mold 50 may be parabolic in shape and may produce parabolic mirror blanks. This may minimize the amount of grinding and polishing necessary to finish the mirror blank.

After soaking, the mirror blank (which is now monolithic (i.e. one-piece)) is allowed to cool naturally. Cooling naturally may comprise allowing the mirror blank to cool in an environment having an absence of temperature regulation or in an environment where the temperature is regulated to a constant (e.g. non-varying) temperature (e.g. room temperature in a thermostatically controlled room). Natural cooling is not necessary. In some embodiments, after soaking the mirror blank may be annealed in a process where the mirror blank is located in an environment where the temperature is actively regulated to match a specified temperature profile.

In some embodiments, during cooling, the mirror blank is arranged within a vessel having an insulating character (e.g. low thermal conductivity and/or high specific heat capacity) such as a kiln. In such embodiments, after soaking, the interior compartment of the vessel is at or near the soaking temperature (e.g. 750° Celsius) while the temperature of the environment exterior to the vessel may range between 5° and 50° Celsius. In some embodiments, the temperature of the environment exterior to the vessel is unregulated. In other embodiments, the temperature of the environment exterior to the vessel may be regulated to a constant temperature (e.g. room temperature in a thermostatically controlled room). In particular embodiments, the temperature exterior to the vessel may be regulated to a constant temperature of approximately 20° to 25° Celsius. The vessel, due to its insulating character, may slow down or otherwise retard the rate at which the mirror blank cools.

In some embodiments, the mirror blank is allowed to cool to the temperature of the environment exterior to the vessel while remaining within the vessel. In other embodiments, cooling naturally may comprise multiple cooling steps. In one particular embodiment, a first cooling step comprises allowing the mirror blank to cool while remaining in the closed vessel until a transition temperature is reached. A second cooling step may comprise opening the interior compartment of the vessel to be in fluid communication with the environment on an exterior of the vessel after the transition temperature is reached. In some embodiments, the transition temperature is approximately 110° Celsius (+/−5%), although this may vary in other embodiments. Cooling the mirror blank using multiple steps may shorten the length of time to cool the mirror blank. In particular, the first step may take approximately 24 hours while the second step may take approximately 4 hours.

After cooling, the resulting mirror blank may be removed from mold 50. Where mold surface 51 is spherically convex, the mirror blank will have a roughly spherically concave surface and negligible internal stress. In some embodiments, the concave surface of the mirror blank may require a grinding and/or polishing step to further shape the mirror blank. In some embodiments, the concave surface of the mirror blank may first be ground and/or polished into a substantially spherical shape, although this step is not necessary. In some embodiments, the concave surface of the mirror banks may be ground and/or polished into a parabolic shape (with or without first grinding and/or polishing the concave surface into a spherical shape). The grinding and polishing steps may require multiple iterations and testing to achieve the desired shape.

The finished mirror blank has a structure similar to the mirror blank assembly, except that the mirror blank is monolithic (e.g. one-piece). For example, if mirror blank assembly 10 is placed in mold 50 and heated to fuse together its components, the finished mirror blank will comprise a primary glass portion 12, a plurality of glass spline portions 16 and a backing glass portion 14.

Similarly, if assembled mirror blank assembly 110 is used, the resulting mirror blank will comprise a primary glass portion 112, a plurality of glass spline portions 116 and a backing glass portion 114. The mirror blank will additionally include backing opening 114d. Backing opening may a circular perimeter having a center through which the axis of symmetry extends.

If assembled mirror blank 210 is used, the resulting mirror blank will comprise a primary glass portion 212, a plurality of glass spline portions 216 and a backing glass portion 214. The mirror blank will additionally include the primary opening 212d and may or may not include backing opening 214d. Primary opening 212d may have a circular perimeter having a center through which the axis of symmetry extends.

If assembled mirror blank 310 is used, the resulting mirror blank will comprise a primary glass portion 312, a plurality of glass spline portions 316 and a backing glass portion 314. The mirror blank may include either or both of primary opening 312d and backing opening 314d and will additionally include a connector portion 318 or 320.

If assembled mirror blank 410 is used, the resulting mirror blank will comprise a primary glass portion 412, a plurality of glass spline portions 416 and a backing glass portion 414. The mirror blank may include any or all of primary opening 412d, backing opening 414d and connector portion 318 (or 320). The mirror blank will additionally include one or more brace portions 422.

The resulting mirror blank may share many other properties of the assembled mirror blank. The resulting mirror blank may have a plurality of spline portions having the same shape and size that extend in radial directions from an axis of symmetry of the resulting mirror blank. Spline portions may have equal angular spacing between circumferentially adjacent pairs of spline portions. The resulting mirror blank may have a primary circular perimeter having a diameter $d_1$ wherein a center of the primary circular perimeter intersects the axis of symmetry of the resulting mirror blank. The backing portion may have a backing circular perimeter wherein a center of the backing primary circular perimeter intersects the axis of symmetry of the resulting mirror blank.

The primary portion of the resulting mirror blank and the backing portion of the resulting mirror blank may have a spacing of approximately x, corresponding to a first height of the spline portions closest to the axis of symmetry. In some embodiments, the portions of the splines most distal from the axis of symmetry may have a height of approximately y, that is equal to or less than the first height x. For each spline portion, the first height of the spline portion may be in a range between ½ to 1/20 of the diameter $d_1$ of the primary portion of the resulting mirror blank. In other embodiments, for each spline portion, the first height of the spline portion is in a range between 1/6 to 1/10 of the diameter $d_1$ of the primary portion of the resulting mirror blank.

The resulting mirror blank, or any mirror blank based on assembled mirror blanks 10, 110, 210, 310 or 410 or a variation thereof will have a reduced weight as compared to a solid glass mirror blank. Furthermore, in some embodiments, the entire process described above, including preparation time (such as cutting, grinding and shaping of the individual components), assembling the mirror blank assembly, fusing and cooling may only take approximately 72 hours. Since the internal stresses are reduced, there are fewer chances of mirror blanks cracking. Accordingly, the process is less expensive and creates a product that is easier to install and allows for significant weight savings in making telescopes.

While a number of exemplary aspects and embodiments are discussed herein, those of skill in the art will recognize certain modifications, permutations, additions and sub-combinations thereof. For example:

Although only a few embodiments are depicted in the drawings, a mirror blank assembly can include any combination of one or more of a connector, glass braces, multi-layered round glass segments, primary openings and backing openings in primary glass and backing glass respectively.

Although the above method is described for creating a concave mirror blank, a similar method could be used for forming a convex mirror blank. Such a method would require a concave mold and substantially similar mirror blank assemblies.

While a number of exemplary aspects and embodiments have been discussed above, those of skill in the art will recognize certain modifications, permutations, additions and sub-combinations thereof.

What is claimed is:

1. A method for manufacturing a mirror blank comprising:
   providing a primary piece of glass comprising a primary planar surface and a backing piece of glass comprising a backing planar surface;
   assembling a mirror blank assembly, wherein assembling the mirror blank assembly comprises interposing a plurality of glass splines between the primary glass and the backing glass, wherein interposing the plurality of glass splines comprises:
   for each glass spline, abutting a first surface of the glass spline against the primary planar surface of the primary glass and abutting a second surface of the glass spline, the second surface opposed to the first surface, against the backing planar surface of the backing glass; and
   arranging the plurality of glass splines to be circularly symmetric about an axis of symmetry that is orthogonal to the primary planar surface and the backing planar surface, to extend in directions that are radial from the axis of symmetry and such that portions of the glass splines closest to the axis of symmetry are spaced apart from one another; and
   heating the mirror blank assembly to fuse the interposed glass splines to the primary glass and the backing glass while the primary glass and the secondary glass remain spaced apart from one another by the interposed glass splines to thereby provide the mirror blank;
   wherein the primary glass has a primary circular perimeter having a primary diameter $d_1$ and the backing glass has a backing circular perimeter having a backing diameter $d_2$ and $d_1 > d_2$.

2. A method according to claim 1 wherein the primary glass, the backing glass and the glass splines have thermal coefficients that are the same +/−50.

3. A method according to claim 1 wherein each of the glass splines has a first height dimension x in a direction extending between the primary planar surface and the backing planar surface at a side of the glass spline closest to the axis of symmetry and a second height dimension y in the direction extending between the primary planar surface and the backing planar surface at a side of the glass spline most distal from the axis of symmetry and where y<x.

4. A method according to claim 1 comprising shaping the primary glass to provide a primary opening therethrough.

5. A method according to claim 1 comprising shaping the backing glass to provide a backing opening therethrough.

6. A method according to claim 5 comprising shaping the primary glass to provide a primary opening therethrough.

7. A method according to claim 1 wherein interposing the plurality of glass splines between the primary glass and the backing glass comprises spacing the glass splines about the axis of symmetry with equal angular spacing between circumferentially adjacent pairs of glass splines.

8. A method according to claim 1 wherein locating the plurality of glass splines such that the portions of the glass splines closest to the axis of symmetry are spaced apart from the axis of symmetry comprises locating the plurality of glass splines such that the portions of the glass splines closest to the axis of symmetry are spaced apart from the axis of symmetry by a radial dimension that is the same for each glass spline.

9. A method according to claim 1 wherein assembling the mirror blank assembly comprises interposing a glass connector between the primary glass and the backing glass, wherein interposing the glass connector between the primary glass and the backing glass comprising abutting a first surface of the glass connector against the primary planar surface of the primary glass and abutting a second surface of the glass connector against the backing planar surface of the backing glass and wherein heating the mirror blank assembly comprises heating the interposed glass connector and thereby fusing the glass connector to the primary glass and the backing glass.

10. A method according to claim 9 comprising shaping the glass connector to define a bore therethrough and wherein interposing the glass connector between the primary glass and the backing glass comprises extending at least a portion of the bore between the primary planar surface of the primary glass and the backing planar surface of the backing glass.

11. A method according to claim 10 comprising shaping the glass connector to define at least a portion of one or more venting apertures which permit fluid communication between the bore of the glass connector and a region outside of the bore of the glass connector when the glass connector is interposed between the primary glass and the backing glass.

12. A method according to claim 11 wherein the one or more venting apertures are defined in part by at least one of the primary planar surface and the backing planar surface.

13. A monolithic glass mirror blank comprising:
   a primary portion and a backing portion spaced apart from one another; and
   a plurality of spline portions extending between the primary portion and the backing portion;
   wherein, for each spline portion, a first surface of the spline portion is fused to the primary portion and a second surface of the spline portion, the second surface opposed to the first surface, is fused to the backing portion; and
   wherein the plurality of spline portions are arranged to be circularly symmetric about an axis of symmetry, to extend in directions that are radial from the axis of symmetry and such that portions of the glass splines closest to the axis of symmetry are spaced apart from one another;
   wherein the primary portion has a primary circular perimeter having a primary diameter $d_1$ and the backing portion has a backing circular perimeter having a backing diameter $d_2$ and $d_1 > d_2$.

14. A mirror blank according to claim 13 wherein each of the spline portions has a first height dimension x in a direction extending between the primary portion and the backing portion at a side of the spline portion closest to the axis of symmetry and a second height dimension y in the direction extending between the primary portion and the backing portion at a side of the spline portion most distal from the axis of symmetry and where $y < x$.

15. A mirror blank according to claim 13 wherein the primary portion defines a primary opening therethrough.

16. A mirror blank according to claim 13 wherein the backing portion defines a backing opening therethrough.

17. A mirror blank according to claim 16 wherein the primary portion defines a primary opening therethrough.

18. A mirror blank according to claim 13 wherein the spline portions are spaced about the axis of symmetry with equal angular spacing between circumferentially adjacent pairs of spline portions.

19. A mirror blank according to claim 13 wherein the portions of the spline portions closest to the axis of symmetry are spaced apart from the axis of symmetry by a radial dimension that is the same for each spline portion.

20. A mirror blank according to claim 13 comprising a glass connector interposed between, and fused to, the primary portion and the backing portion.

21. A mirror blank according to claim 20 wherein the glass connector defines a bore therethrough, at least a portion of the bore extending between the primary portion and the backing portion.

22. A mirror blank according to claim 21 wherein the glass connector is shaped to define at least a portion of one or more venting apertures which permit fluid communication between the bore of the glass connector and a region outside of the bore of the glass connector.

23. A method according to claim 22 wherein the one or more venting apertures are defined in part by at least one of the primary portion and the backing portion.

* * * * *